(12) United States Patent
Schaude (10) Patent No.: US 9,063,753 B2
(45) Date of Patent: Jun. 23, 2015

(54) SCRIPTING FRAMEWORK FOR BUSINESS OBJECTS

(75) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 12/820,387

(22) Filed: Jun. 22, 2010

(65) Prior Publication Data

US 2011/0314457 A1 Dec. 22, 2011

(51) Int. Cl.
*G06F 9/44* (2006.01)

(52) U.S. Cl.
CPC .............. *G06F 9/444* (2013.01); *G06F 9/4423* (2013.01)

(58) Field of Classification Search
CPC ................................ G06F 9/444; G06F 9/4423
USPC .......................................... 707/803; 717/139
See application file for complete search history.

(56) References Cited

U.S. PATENT DOCUMENTS

| 5,535,394 | A  | * | 7/1996 | Burke et al. ................. 717/157 |
| RE43,905 | E | * | 1/2013 | Bierenbaum ................... 705/39 |
| 2003/0014397 | A1 | * | 1/2003 | Chau et al. ........................ 707/3 |
| 2004/0039732 | A1 | * | 2/2004 | Huang .............................. 707/3 |
| 2004/0177259 | A1 | * | 9/2004 | Volk ............................... 713/193 |
| 2006/0070049 | A1 | * | 3/2006 | Chung ......................... 717/148 |
| 2007/0081520 | A1 | * | 4/2007 | Da Palma et al. ............. 370/352 |
| 2008/0288918 | A1 | * | 11/2008 | Knura et al. ................. 717/106 |

* cited by examiner

*Primary Examiner* — Usmaan Saeed
*Assistant Examiner* — Jagdish Pandya
(74) *Attorney, Agent, or Firm* — Buckley, Maschoff & Talwalkar LLC (57) ABSTRACT

A business object infrastructure may comprise a repository storing a business object having a plurality of nodes, including at least one exit node associated with a code snippet written in a programming language. The business object infrastructure may further include a scripting framework coupled to the repository. The scripting framework may, responsive to a request received from a client device, execute the business object at a processing framework until the exit node is reached. When the exit node is reached, the scripting framework may load the code snippet from the repository and, based on the programming language of the code snippet, select a virtual machine interpreter for the code snippet.

34 Claims, 7 Drawing Sheets

SCRIPTING FRAMEWORK FOR BUSINESS OBJECTS

FIELD

Some embodiments relate to a service-oriented architecture associated with business objects. More specifically, some embodiments provide a framework allowing for the execution of scripts in connection with business objects.

BACKGROUND

An enterprise may access business information using a service-oriented architecture. For example, a client device associated with the enterprise might access a business object, such as a business object related to a purchase order, by exchanging information with a remotely hosted Enterprise Resource Planning (ERP) server via the Internet. The use of a remotely hosted ERP server may help the enterprise avoid the costs and problems associated with maintaining a local, "in house" ERP system.

The provider of the remote ERP server may create a number of standard business objects that are likely to be of interest to various enterprises. For example, the provider might create business objects associated with customer relationship management processes, supply chain information, human resources records, and/or financial data. In many cases, however, an enterprise might want to customize these business objects based its own particular needs. For example, an enterprise might want to verify that all human resources records have valid data for particular information fields. In addition to customizing existing business objects, an enterprise might be interested in creating new business objects based on its particular business needs.

An enterprise might use a scripting language to define business logic associated with a business object. For example, the enterprise might define a series of steps and/or interactions using a script written in the Advance Business Application Programming (ABAP) language. Note, however, that the enterprise might use any of a number of different scripting languages. Moreover, it may be important that the creation and integration of a script into a business object be performed in a simple, efficient, and secure manner.

DETAILED DESCRIPTION

Figure 1:
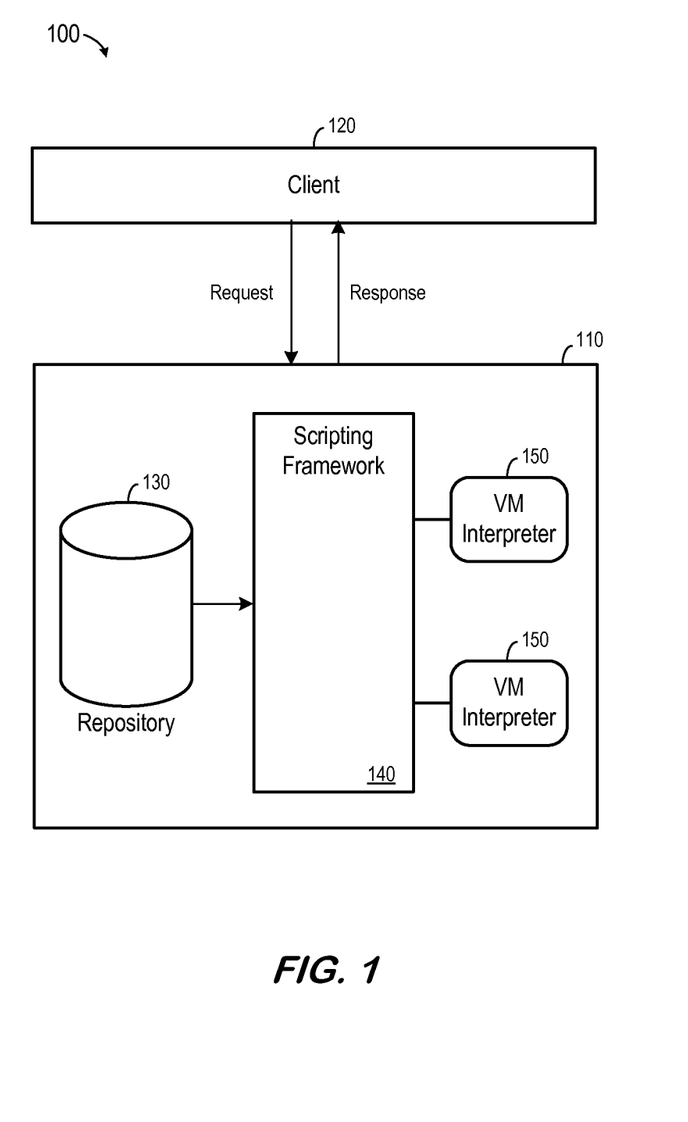
FIG. 1 is a block diagram of a system according to some embodiments.

An enterprise may access business information using a service-oriented architecture. For example, FIG. 1 is a block diagram of a system 100 wherein a business process platform 110 (e.g., associated with an ERP provider) may receive a request from a client device 120. The request might comprise, for example, a request to view a business object related to a purchase order. The use of the remotely hosted business process platform 110 may help the enterprise avoid the costs and problems associated with maintaining a local, "in house" ERP system.

The client device 120 may comprise a Web browser to access services provided by business process platform 110 via HyperText Transport Protocol (HTTP) communication. For example, a user may manipulate a user interface of the client device 120 to input an instruction (e.g., "update inventory"). The client device 120, in response, may transmit a corresponding HTTP service request to the business process platform 110 as illustrated. A service-oriented architecture may conduct any processing required by the request (e.g., updating a list of inventory) and, after completing the processing, provides a response to client device 120.

The business process platform 110 may comprise a service-oriented architecture such as those provided by SAP Business ByDesign® or Salesforce. The client device might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a dedicated standalone application.

Note that FIG. 1 represents a logical architecture for describing processes according to some embodiments, and actual implementations may include more or different components arranged in other manners.

The provider of the business process platform 110 may create a number of standard "business objects" that are likely to be of interest to various enterprises. For example, the provider might create business objects associated with customer relationship management processes, supply chain information, human resources records, and/or financial data. As used herein, the phrase "business object" may refer to a set of entities with common characteristics and common behavior representing a defined business semantic. Note that business data may be stored within physical tables of a database. The database may comprise a relational database such as SAP MaxDB, Oracle, Microsoft SQL Server, IBM DB2, Teradata and the like. Alternatively, the database could be a multi-dimensional database, an eXtendable Markup Language (XML) document, or any other structured data storage system. The physical tables may be distributed among several relational databases, dimensional databases, and/or other data sources.

The structures of and relationships between the physical database tables may complex. Business objects may be used to shield developers and end-users from these complexities. A business object may comprise, for example, a software model including nodes to encapsulate related data and methods.

A business object may be associated with a business entity, such as a customer, partner, sales order, product, store, time, etc., represented in the data of a data source. Each instance of a business object may represent a particular instance of the entity represented by the business object. An instance of a sales order business object may, for example, provide a mapping to the underlying tables storing data associated with a particular sales order.

The provider of the business process platform 110 may create a number of standard business objects that are likely to be of interest to various enterprises and store those objects in a repository 130. In many cases, however, an enterprise might want to customize these business objects and/or create entirely new business objects. For example, an enterprise might want to verify that all human resources records have valid data for particular information fields. An enterprise might use a scripting language to define business logic associated with a business object. For example, the enterprise might define a series of steps and/or interactions using a script written in the ABAP or JavaScript programming languages. Moreover, it may be important that the creation and integration of a script into a business object be performed in a simple, efficient, and secure manner.

According to some embodiments, an enterprise may store a business object in the repository, the business object having a plurality of nodes, including at least one exit node associated with a code snippet written in a programming language. Moreover, a scripting framework 140 coupled to the repository may, responsive to a request received from a client device 120, execute the business object until the exit node is reached. When the exit node is reached, the code snippet may be retrieved from the repository 130 and, based on the programming language of the code snippet, one of a plurality of virtual machine interpreters 150 may be selected for the code snippet.

Figure 2:
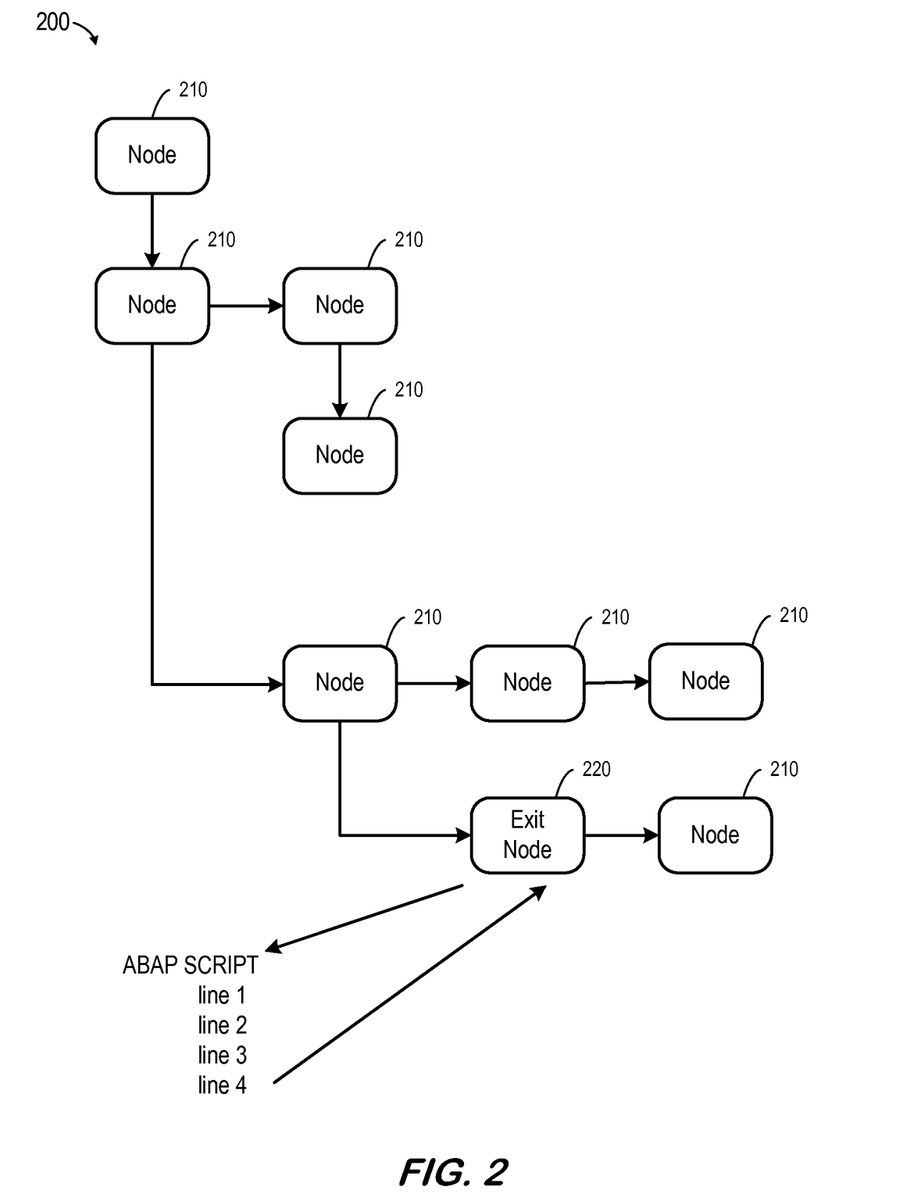
FIG. 2 is a representation of a business object according to some embodiments.

For example, FIG. 2 is a representation 200 of a business object 210 having a number of structured nodes 210 according to some embodiments. As the business object 210 is executed, various nodes may be encountered. At least one of the nodes in the business object is an "exit node" 220. When the exit node is encountered, a code snippet associated with that exit node may be executed (e.g., an ABAP script).

Figure 3:
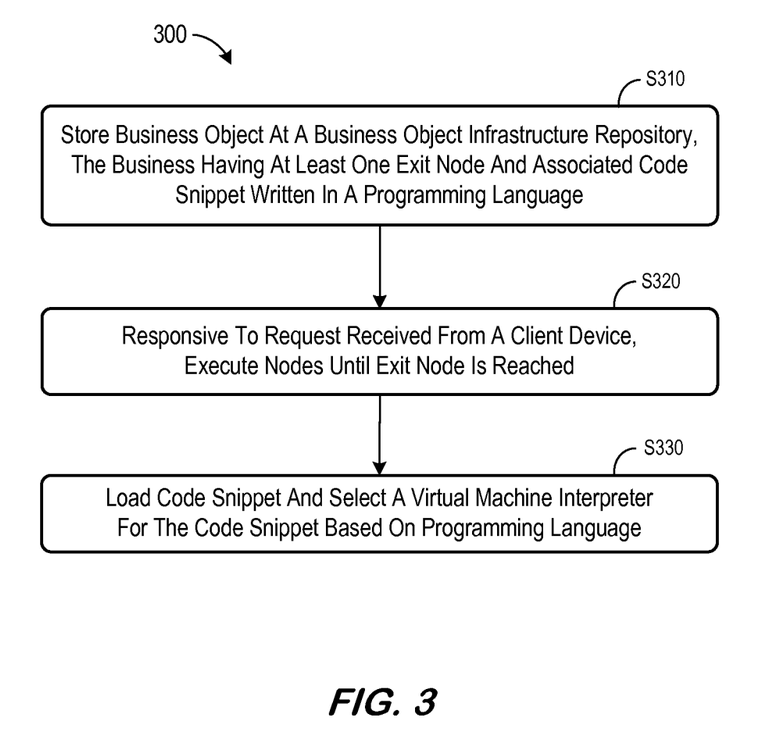
FIG. 3 is a flow diagram of a process according to some embodiments.

FIG. 3 is a flow diagram of process 300 according to some embodiments. The business process platform 110 may execute the process 300 as will be described below, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

Initially, at S310, a business object may be stored at a business object infrastructure repository. The business object may have, for example, a plurality of nodes, including at least one exit node associated with a code snippet written in a programming language. The business object may have been created and/or edited by, for example, a "partner" of a provider of an ERP service (e.g., an ERP software-as-a-service solution) using a partner scripting interface. Note that the business object might be associated with a business object service provider, a process agent, and/or a user interface. Moreover, the code snippet might have been programmed in, by way of example only, ABAP, an ABAP Scripting Language (ABSL), JavaScript, or a Ruby-based language.

Responsive to a request received from a client device (e.g., a client device associated with the partner), the business object may be executed, at S320, at a processing framework until the exit node is reached.

When the exit node is reached, the code snippet may be loaded at S330 from the repository and, based on the programming language of the code snippet, a virtual machine interpreter may be selected for the code snippet. For example, a JavaScript virtual machine interpreter might be selected for the code snippet. In this way, embodiments may provide a runtime environment that executes business logic provided by a partner enterprise. Moreover, embodiments may support different programming languages in an efficient and secure manner.

Figure 4:
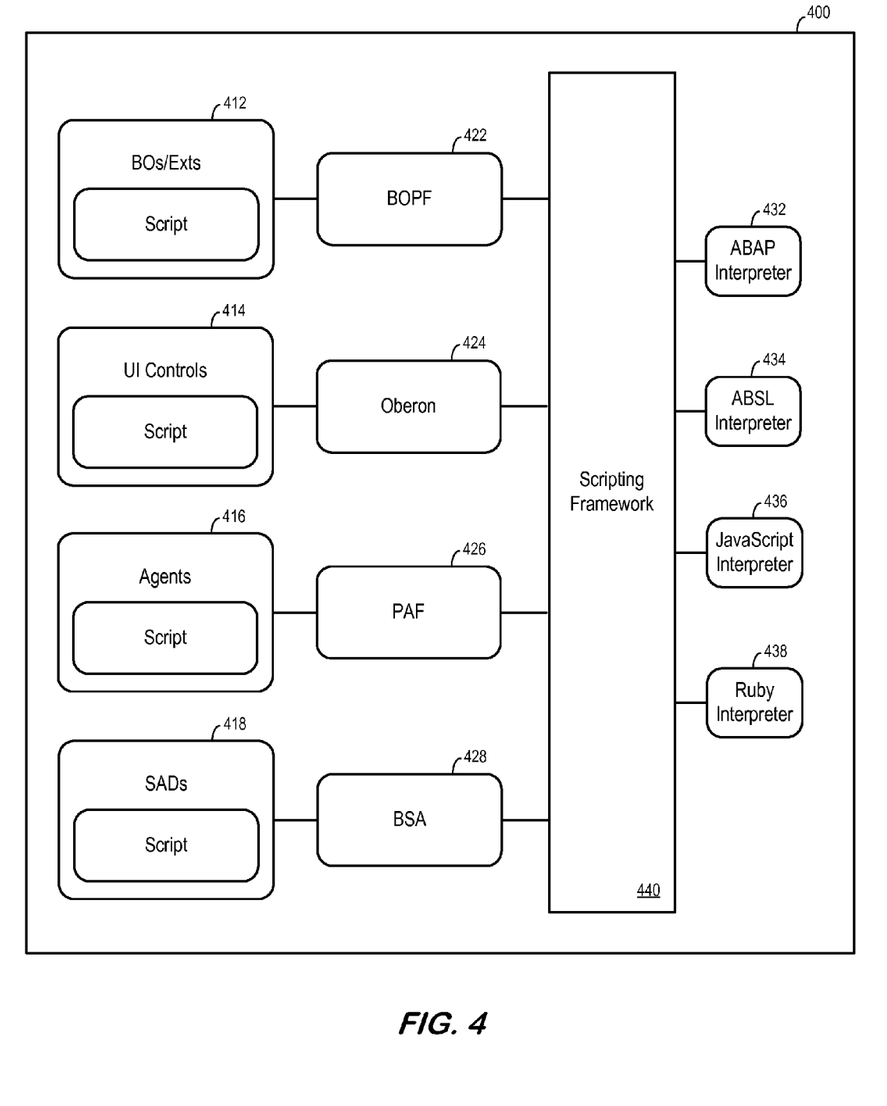
FIG. 4 is a block diagram of a system having a scripting framework according to some embodiments.

FIG. 4 is a block diagram of a system 400 having a scripting framework 440 according to some embodiments. The scripting framework 440 may, for example, receive a script associated with business objects and/or extensions 412 via a business object processing framework 422. Similarly, the scripting framework 440 may receive a script associated with User interface controls 414 via an Oberon framework 424. As other examples, the scripting framework 440 may receive a script associated with an agent 416 via a PAF framework 426 and/or a script associated with SAD 418 via a BSA framework 428.

Figure 5:
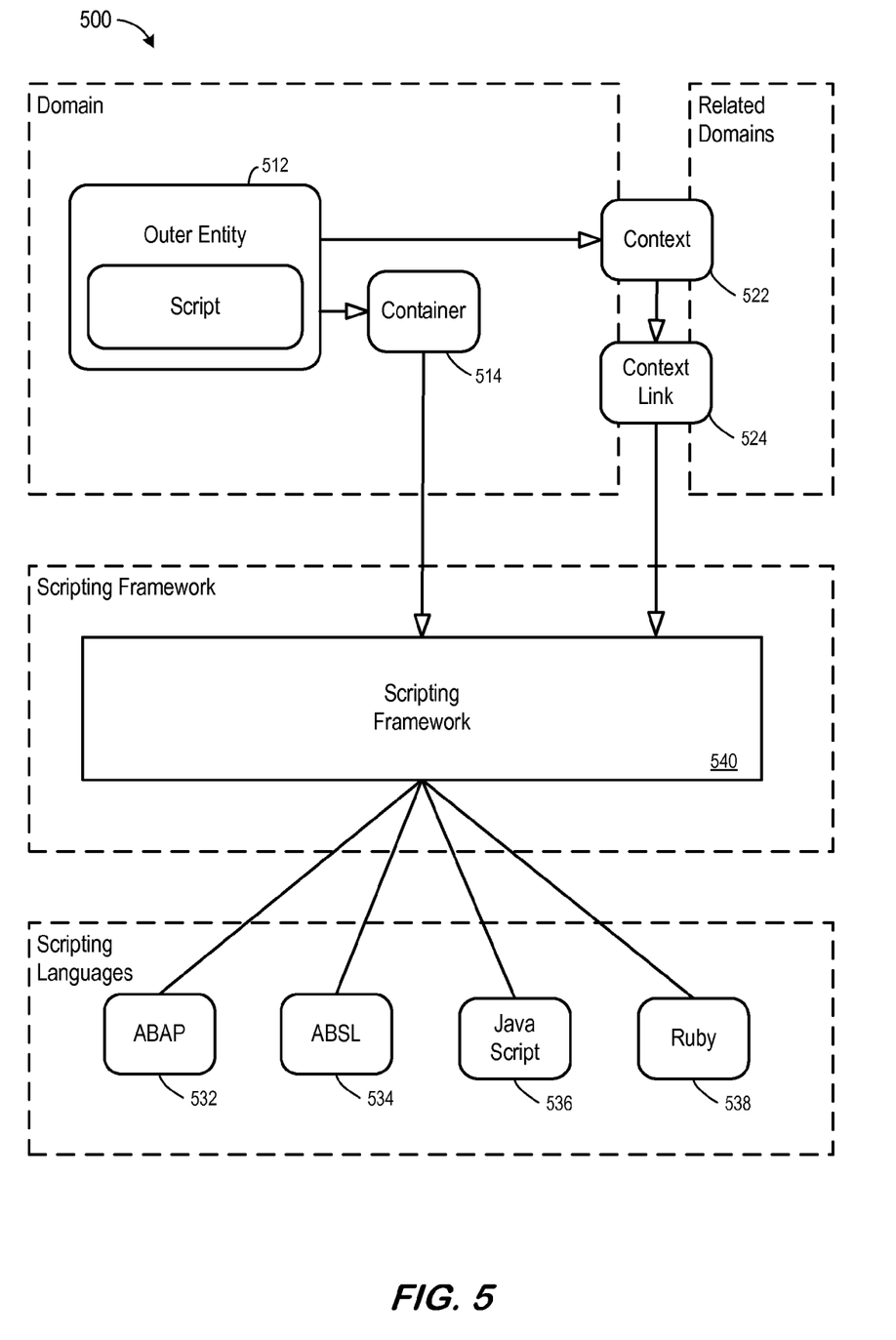
FIG. 5 is a block diagram of a system illustrating domains according to some embodiments.

The scripting framework may access a number of different interpreters in connection with the received scripts and the various domains and/or containers associated with those scripts: an ABAP interpreter 432, an ABSL interpreter 434, a JavaScript interpreter 436, and a Ruby-based language interpreter 438. For example, FIG. 5 is a block diagram of a system 500 illustrating domains according to some embodiments.

In particular, a scripting framework 540 may receive information associated with a code snippet script and outer entity 512 associated with a first domain (e.g., associated with UI controllers, business objects and/or extensions, or process agents) via a container 514 (e.g., a container associated with an enterprise service infrastructure, BSA, or PAF). Note that the container 514 may be provided to the scripting framework 540 during development or at invocation time.

In addition, the scripting frame work may receive information associated with the code snippet script and outer entity 512 in connection with a second, related domain, via context information 522 and/or a context link 524. The related domain might be associated with, for example, another business object, a re-use service, and/or a re-use function.

The scripting framework 540 may then execute the code snippet based on the context 522 provided to the scripting framework 540. Moreover, execution of the code snippet may be performed in accordance with and of ABAP 532, ABSL 534, JavaScript 536, or Ruby 538 programming languages. Note that the scripting framework 540 may execute according to any of the embodiments described herein during development or at invocation time.

Figure 6:
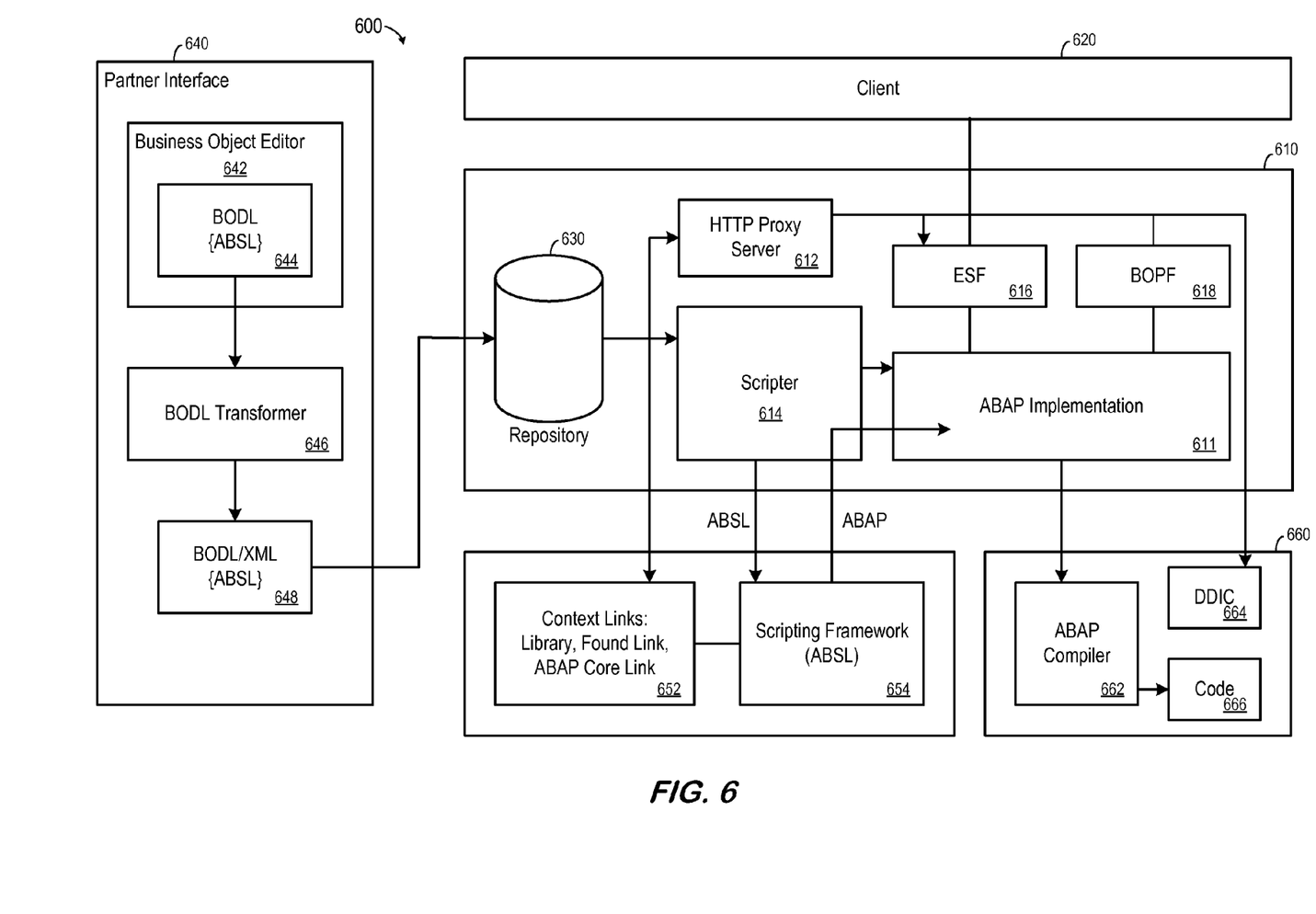
FIG. 6 illustrates a control flow associated with a business object according to some embodiments.

FIG. 6 is a more detailed block diagram of a system 600 according to some embodiments. In particular, a service-oriented business object infrastructure 610 may provide ERP information to a client device 620. Moreover, a partner interface 640 may be used to create a business object and/or a code snippet associated with the business object. The partner interface 640 may, for example, be associated with the Visual Studio® user interface available from SAP AG® and may be used by a partner to develop business objects, process agents, user interfaces, etc. For example, a business object editor 642 may be used to define business object dynamic linking information 644, including an ABSL script. The business object may include, for example, nodes, elements, queries, and/or actions per node and within the business object, an exit node may be defined in connection with business logic created by the partner (that is, the ABSL script).

The business object dynamic linking information 644 may then be transformed into XML information 648 (including the ABSL script) by a business object dynamic linking transformer 646. The XML information 648 may then be stored into a repository 630 of the business object infrastructure 610. Note that information stored into the repository 630 by a first partner might not be accessible by a second partner.

When a request associated with a business object is received from the client device 620, the appropriate information may be retrieved from the repository 630 and provided to an HTTP proxy server 612, a context links engine 652 (e.g., associated with a context library, found links, and/or core links) and/or a scripter platform 614. The HTTP proxy server 612 may, for example, update information in a data dictionary table 664 of an ABAP platform 660 as well as providing information to an enterprise services framework 616 and a business object processing framework 618, each of which may be coupled to an ABAP implementation 611.

When an exit node is encountered, the scripter platform 614 may provide an appropriate ABSL code snippet to a scripting framework 654 which may then in turn provide an ABAP code snippet to an ABAP compiler 662 (e.g., via the ABAP implementation 611 and scripter platform 614). The ABAP compiler 662 may then generate the appropriate code 666 to be executed in connection with that exit node.

With such a system 600, a partner of a service-oriented ERP provider may define a business object with the partner interface 640, including nodes and one or more exit nodes along with code snippets, such as ABSL code snippets, to be performed when each exit node is encountered. The ABSL code snippets may be compiled into ABAP code and stored in the repository 630. A runtime object of the business object may also be created, and an exit in the business object processing framework may be defined for each code snippet.

Figure 7:
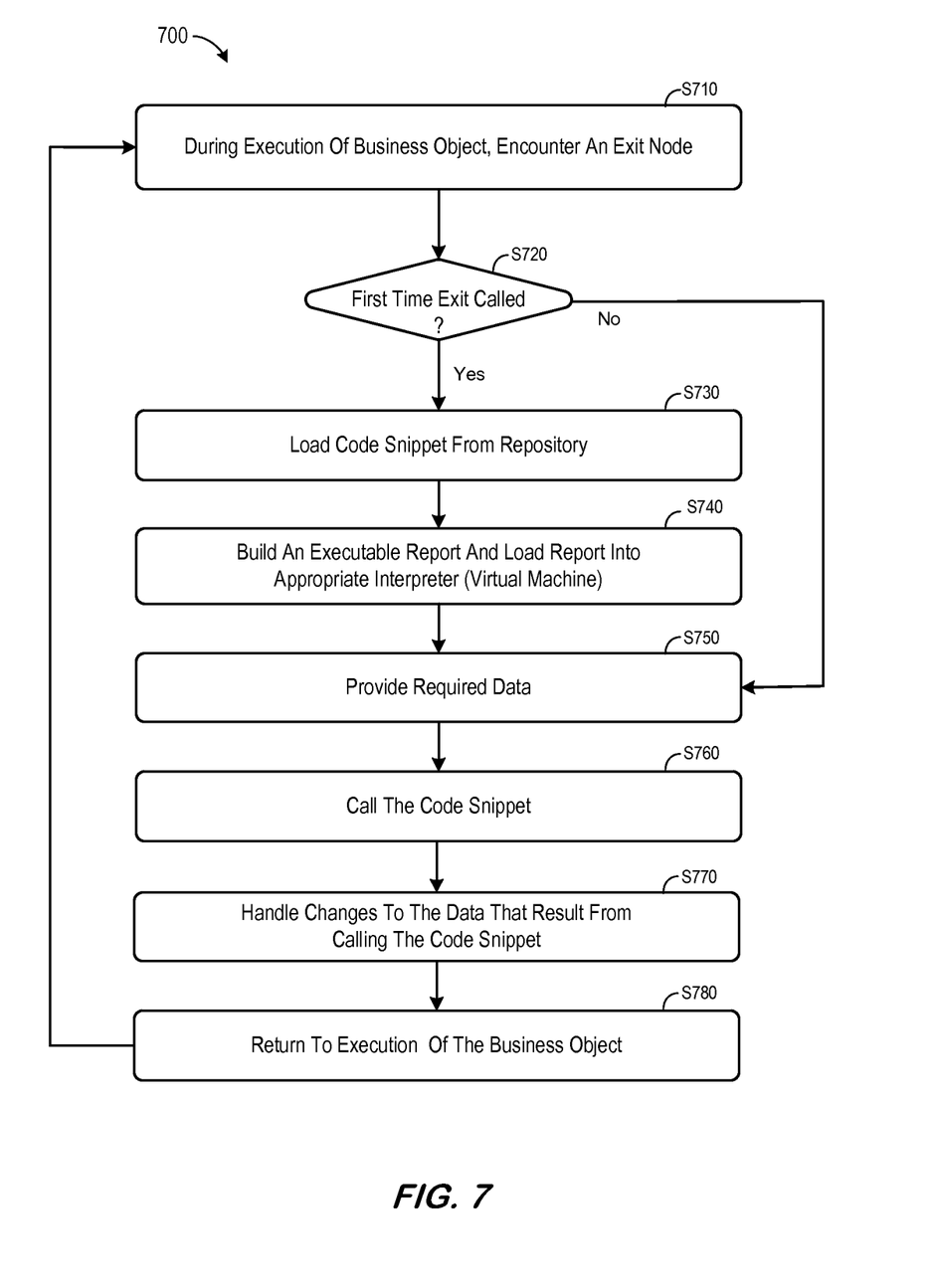
FIG. 7 is a flow diagram of a method according to some embodiments.

FIG. 7 is a flow diagram of a method 700 that might then be performed according to some embodiments. For example, a client may interact (e.g., via the client device 620) with a user interface that includes an exit node coded by the partner. The runtime business object processing framework 618 may call the scripting framework 654 when the exit node is encountered at S710.

At S720, it may be determined if this is the first time the exit node has been encountered. If the exit node has been encountered before, the process continues at S750 (e.g., because the code snippet may have already been loaded into the appropriate virtual machine). If this is the first time the exit has been encountered at S720, the code snippet may be loaded at S730 from the repository. An executable report may then be built and loaded into the appropriate interpreter (e.g., virtual machine) at S740. That is, the scripting framework may determine the language associated with this particular exit and select the virtual machine as appropriate.

Whether or not this is the first time the exit node has been encountered, the scripting framework may call a fixed entry point that provides the required data, calls the code snippet, and takes care of any changes to the data (e.g., changes that resulted from execution of the code snippet). In particular, at S750 the scripting framework may prepare data associated with the exit node. The code snippet may then be called at S760 via the selected virtual machine interpreter. According to some embodiments, the code snippet is a method of a class and calling the code snippet at S760 may comprise calling the method of the class. At S770, the scripting framework may update any changed data resulting from execution of the code snippet. Execution of the business object may be resumed at S780 until another exit node is encountered. In this way, an efficient and secure method of allowing partners to define business logic for business objects may be provided in connection with a number of different scripting languages and/or protocols.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
storing a business object at a business object infrastructure repository, the business object having a plurality of nodes, including at least one exit node associated with a code snippet written in a programming language;
responsive to a request received from a client device, executing the business object at a processing framework until the exit node is reached;
loading, from the repository, the code snippet that is written in the programming language and associated with the exit node;
selecting a virtual machine interpreter, from a plurality of virtual machine interpreters, for the code snippet that is associated with the exit node of the business object based on the programming language of the code snippet that is associated with the exit node of the business object;
calling the code snippet via the selected virtual machine interpreter; and
returning to the business object via the exit node and resuming execution of the business object;
wherein the exit node that is included in the business object and associated with the code snippet written in the programming language is a first exit node that is included in the business object and associated with a first code snippet written in a first programming language;
wherein the loading, from the repository, the code snippet that is written in the programming language and associated with the exit node comprises:
loading, from the repository, the first code snippet that is written in the first programming language and associated with the first exit node;
wherein the selecting a virtual machine interpreter, from a plurality of virtual machine interpreters, for the code snippet based on the programming language of the code snippet comprises:
selecting a first virtual machine interpreter for the first code snippet based on the first programming language of the first code snippet; and
wherein the returning to the business object via the exit node and resuming execution of the business object comprises:
returning to the business object via the first exit node and resuming execution of the business object until a second exit node of the business object is reached, the second exit node of the business object being associated with a second code snippet written in a second programming language that is different than the first programming language in which the first code snippet that is associated with the first exit node of the business object is written.

2. The method of claim 1, further comprising:
preparing, by a scripting framework, data associated with the exit node; and updating, by the scripting framework, any changed data resulting from execution of the code snippet.

3. The method of claim 2, further comprising:
receiving, from a partner scripting interface, the business object and code snippet.

4. The method of claim 2, wherein the business object is associated with at least one of a business object service provider, a process agent, or a user interface.

5. The method of claim 2, wherein the programming language is associated with at least one of Advanced Business Application Programming (ABAP), an ABAP Scripting Language (ABSL), JavaScript, or a Ruby-based language.

6. The method of claim 2, wherein the code snippet is associated with (i) one of a plurality of different domains, or (ii) one of a plurality of different containers.

7. The method of claim 2, wherein execution of the business object is further based on a context provided to the scripting framework.

8. The method of claim 2, wherein the business object infrastructure is associated with a hosted enterprise resource planning software-as-a-service solution.

9. The method of claim 2, wherein the code snippet is a method of a class and said calling the code snippet comprises calling the method of the class.

10. The method of claim 1, wherein the returning to the business object via the exit node and resuming execution of the business object comprises:
returning to the business object via the exit node and resuming execution of the business object until another exit node is reached.

11. The method of claim 1, wherein a programming language of one of the plurality of nodes of the business object is different than the programming language of the code snippet that is associated with the exit node of the business object.

12. The method of claim 1, wherein the business object that includes the exit node is customized by the code snippet that is associated with the exit node of the business object.

13. The method of claim 1, further comprising:
customizing the business object;
wherein the customizing the business object comprises:
associating the code snippet with the exit node of the business object.

14. The method of claim 1, wherein the business object that includes the exit node associated with the code snippet provides a mapping to a database.

15. The method of claim 1, wherein an instance of the business object that includes the exit node associated with the code snippet provides a mapping to a table storing data associated with a particular sales order.

16. The method of claim 1, wherein a programming language of one of the plurality of nodes of the business object is different than the programming language of the code snippet that is associated with the exit node of the business object;
wherein the business object that includes the exit node is customized by the code snippet that is associated with the exit node of the business object; and
wherein the business object that includes the exit node associated with the code snippet provides a mapping to a database.

17. The method of claim 1, wherein a programming language of one of the plurality of nodes of the business object is different than the programming language of the code snippet that is associated with the exit node of the business object;
wherein the business object that includes the exit node is customized by the code snippet that is associated with the exit node of the business object; and
wherein an instance of the business object that includes the exit node associated with the code snippet provides a mapping to a table storing data associated with a particular sales order.

18. The method of claim 1, further comprising:
when the second exit node is reached, loading, from the repository, the second code snippet that is written in the second programming language and associated with the second exit node and, selecting a second virtual machine interpreter for the second code snippet based on the second programming language of the second code snippet, the second virtual machine interpreter being different than the first virtual machine interpreter selected for the first code snippet based on the first programming language of the first code snippet;
calling the second code snippet via the second virtual machine interpreter; and
returning to the business object via the second exit node and resuming execution of the business object.

19. The method of claim 1, wherein the loading, from the repository, the code snippet that is written in the programming language and associated with the exit node; and selecting a virtual machine interpreter, from a plurality of virtual machine interpreters, for the code snippet that is associated with the exit node of the business object based on the programming language of the code snippet that is associated with the exit node of the business object comprises:
when the exit node is reached, loading, from the repository, the code snippet that is written in the programming language and associated with the exit node and, selecting a virtual machine interpreter, from a plurality of virtual machine interpreters, for the code snippet that is associated with the exit node of the business object based on the programming language of the code snippet that is associated with the exit node of the business object.

20. A non-transitory computer-readable medium storing one or more programs comprising instructions, which when executed by a device, cause the device to:
store a business object at a business object infrastructure repository, the business object having a plurality of nodes, including at least one exit node associated with a code snippet written in a programming language;
responsive to a request received from a client device, execute the business object at a processing framework until the exit node is reached;
load, from the repository, the code snippet that is written in the programming language and associated with the exit node;
select a virtual machine interpreter, from a plurality of virtual machine interpreters, for the code snippet that is associated with the exit node of the business object based on the programming language of the code snippet that is associated with the exit node of the business object;
prepare, by a scripting framework, data associated with the exit node;
call the code snippet via the selected virtual machine interpreter;
update, by the scripting framework, any changed data resulting from execution of the code snippet; and
return to the business object via the exit node and resume execution of the business object;
wherein the exit node that is included in the business object and associated with the code snippet written in the programming language is a first exit node that is included in the business object and associated with a first code snippet written in a first programming language;
wherein the load, from the repository, the code snippet that is written in the programming language and associated with the exit node comprises:
  load, from the repository, the first code snippet that is written in the first programming language and associated with the first exit node;
wherein the select a virtual machine interpreter, from a plurality of virtual machine interpreters, for the code snippet based on the programming language of the code snippet comprises:
  select a first virtual machine interpreter for the first code snippet based on the first programming language of the first code snippet; and
wherein the return to the business object via the exit node and resume execution of the business object comprises:
  return to the business object via the first exit node and resume execution of the business object until a second exit node of the business object is reached, the second exit node of the business object being associated with a second code snippet written in a second programming language that is different than the first programming language in which the first code snippet that is associated with the first exit node of the business object is written.

21. The medium of claim 20, wherein the one or more programs further comprise instructions, which when executed by the device, cause the device to:
  receive, from a partner scripting interface, the business object and code snippet.

22. The medium of claim 20, wherein the business object is associated with at least one of a business object service provider, a process agent, or a user interface.

23. The medium of claim 20, wherein the programming language is associated with at least one of Advanced Business Application Programming (ABAP), an ABAP Scripting Language (ABSL), JavaScript, or a Ruby-based language.

24. The medium of claim 20, wherein the code snippet is associated with (i) one of a plurality of different domains, or (ii) one of a plurality of different containers.

25. The medium of claim 20, wherein execution of the business object is further based on a context provided to the scripting framework.

26. The medium of claim 20, wherein the return to the business object via the exit node and resume execution of the business object comprises:
  return to the business object via the exit node and resume execution of the business object until another exit node is reached.

27. The medium of claim 20, wherein the load, from the repository, the code snippet that is written in the programming language and associated with the exit node; and select a virtual machine interpreter, from a plurality of virtual machine interpreters, for the code snippet that is associated with the exit node of the business object based on the programming language of the code snippet that is associated with the exit node of the business object comprises:
  when the exit node is reached, load, from the repository, the code snippet that is written in the programming language and associated with the exit node and, select a virtual machine interpreter, from a plurality of virtual machine interpreters, for the code snippet that is associated with the exit node of the business object based on the programming language of the code snippet that is associated with the exit node of the business object.

28. A system comprising:
  a repository that includes a memory, the repository storing a business object having a plurality of nodes, including at least one exit node associated with a code snippet written in a programming language; and
  a scripting framework that includes hardware and is coupled to said repository, the scripting framework to:
    responsive to a request received from a client device, execute the business object at a processing framework until the exit node is reached,
  load, from the repository, the code snippet that is written in the programming language and associated with the exit node;
  select a virtual machine interpreter, from a plurality of virtual machine interpreters, for the code snippet that is associated with the exit node of the business object based on the programming language of the code snippet that is associated with the exit node of the business object;
  call the code snippet via the selected virtual machine interpreter; and
  return to the business object via the exit node and resume execution of the business object;
  wherein the exit node that is included in the business object and associated with the code snippet written in the programming language is a first exit node that is included in the business object and associated with a first code snippet written in a first programming language;
  wherein the load, from the repository, the code snippet that is written in the programming language and associated with the exit node comprises:
    load, from the repository, the first code snippet that is written in the first programming language and associated with the first exit node;
  wherein the select a virtual machine interpreter, from a plurality of virtual machine interpreters, for the code snippet based on the programming language of the code snippet comprises:
    select a first virtual machine interpreter for the first code snippet based on the first programming language of the first code snippet; and
  wherein the return to the business object via the exit node and resume execution of the business object comprises:
    return to the business object via the first exit node and resume execution of the business object until a second exit node of the business object is reached, the second exit node of the business object being associated with a second code snippet written in a second programming language that is different than the first programming language in which the first code snippet that is associated with the first exit node of the business object is written.

29. The system of claim 28, wherein the scripting framework is further to:
  prepare data associated with the exit node, and
  update any changed data resulting from execution of the code snippet.

30. The system of claim 29, wherein the scripting framework is further to:
  receive, from a partner scripting interface, the business object and code snippet.

31. The system of claim 29, wherein the business object is associated with at least one of a business object service provider, a process agent, or a user interface.

32. The system of claim 29, wherein the programming language is associated with at least one of Advanced Business Application Programming (ABAP), an ABAP Scripting Language (ABSL), JavaScript, or a Ruby-based language.

33. The system of claim 28, wherein the return to the business object via the exit node and resume execution of the business object comprises:
- return to the business object via the exit node and resume execution of the business object until another exit node is reached.

34. The system of claim 28, wherein the load, from the repository, the code snippet that is written in the programming language and associated with the exit node; and select a virtual machine interpreter, from a plurality of virtual machine interpreters, for the code snippet that is associated with the exit node of the business object based on the programming language of the code snippet that is associated with the exit node of the business object comprises:
- when the exit node is reached, load, from the repository, the code snippet that is written in the programming language and associated with the exit node and, select a virtual machine interpreter, from a plurality of virtual machine interpreters, for the code snippet that is associated with the exit node of the business object based on the programming language of the code snippet that is associated with the exit node of the business object.

* * * * *